Feb. 15, 1927.

W. A. McCOLLOUGH 1,617,339

CHICK FEEDER

Filed March 15, 1926

Inventor

W. A. McCOLLOUGH

By Earl M. Sinclair

Attorney

Patented Feb. 15, 1927.

1,617,339

UNITED STATES PATENT OFFICE.

WILLIAM A. McCOLLOUGH, OF WEBSTER CITY, IOWA.

CHICK FEEDER.

Application filed March 15, 1926. Serial No. 94,690.

The object of this invention is to provide an improved device for feeding young chicks and the like, which is simple, economical of manufacture, sanitary, and so designed as to conserve feed by preventing the scattering thereof by the fowls.

A further object is to provide an improved chick feeder comprising an open pan having a removable and replaceable apertured shield which partially covers the grain in the pan, thereby tending to keep it clean and to prevent scattering thereof while at the same time giving free access to the grain for feeding purposes.

A further object of the invention is to provide an improved chick feeder composed of an open pan and an apertured shield removably mounted therein whereby the device may be readily taken apart and cleaned, the apertured top of the shield being spaced somewhat below the upper margins of the walls of the pan in use whereby the projecting portions of the walls act as baffles to prevent scattering of the grain.

With these and other objects in view, my invention consists in the construction, arrangement and combination of elements hereinafter set forth, pointed out in the claims and illustrated by the accompanying drawing, in which—

Figure 1:
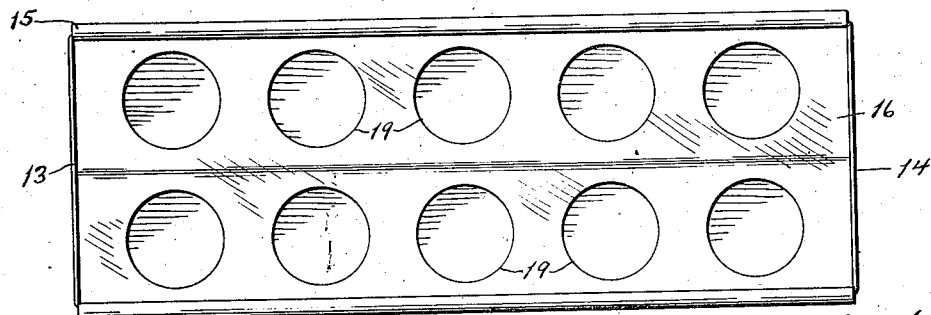
Figure 1 is a plan view of the complete device.
Figure 2:
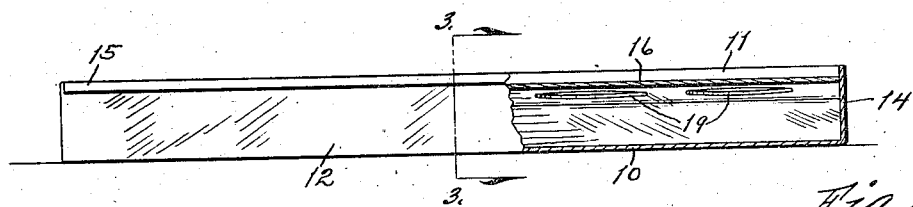
Figure 2 is a side elevation of the same, partly in section.

In the construction of the device as shown an open topped pan of rectangular form is provided and is formed from a single piece of sheet metal, preferably galvanized, by cutting, bending, shaping and soldering or spot welding to produce the desired shape. It is composed of a bottom 10, side walls 11 and 12 and end walls 13 and 14 rising therefrom, the walls preferably being rolled or formed with downturned beads or flanges 15 on their upper margins. The pan is relatively shallow and is adapted to receive feed for chickens and the like, such as chopped, ground or mixed grains. A shield device is separately formed of a single piece of sheet metal and is adapted to be removably and replaceably mounted in the pan and partially cover the feed therein. The shield device is composed of a top or body portion 16 having integral, downwardly extending flanges 17 and 18 on its longitudinal margins, which are of less width than the height of the walls of the pan. The top or body 16 of the shield is bent or bowed upwardly in its longitudinal center and slopes downwardly toward the flanges 17, 18, and is formed with a plurality of apertures 19 arranged in rows on opposite sides of its longitudinal center, for access to the feed.

Figure 3:
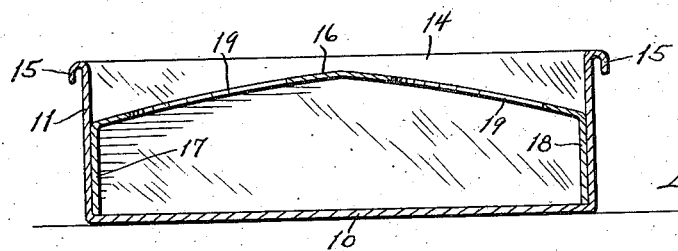
Figure 3 is a cross-section, on an enlarged scale, on the line 3—3 of Figure 2.
Figure 4:
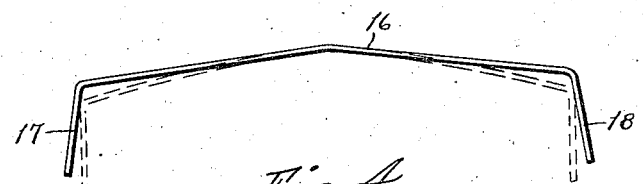
Figure 4 is an end elevation of the shield device removed from the pan, the dotted lines indicating the position assumed by the device when in position for use.

In practical use the device is constructed as shown and described and the pan is nearly filled with suitable feed and the shield device placed therein, being sprung into place between the side walls and frictionally engaging the same to prevent its accidental removal. When so mounted the top or body portion is elevated in its central portion even more than when not assembled, as indicated in Figure 4, and its two sides slope downwardly to a considerable extent toward the side flanges, which support the side margins of the apertured top at a material distance below the tops of the side walls 11 and 12 as most clearly shown in Figure 3. The fowls feed through the apertures 19 from either side, and any grain which is removed from beneath the shield but not consumed is retained by the sloping top of the shield or the projecting portions of the side walls and thereby prevented from being scattered out of the device and wasted. The shield also covers and protects the major portion of the feed in the pan, tends to prevent dirt or foreign substances from entering the same, and also prevents the fowls from successfully getting into the feed and scratching. In all of these respects it tends to conserve the feed. The device is easily taken apart for cleaning and for refilling and is therefore sanitary and useful.

I claim as my invention—

1. A chick feeder, comprising an open topped pan and a shield device having an apertured top and downturned marginal flanges adapted to be received and frictionally held between walls of the pan, said flanges being of less width than the height of the said walls whereby the marginal portions of the apertured top rest on a level below the upper margins of the said walls, and whereby the shield device may be adjusted vertically within the pan in conformity to the amount of feed contained therein.

2. A chick feeder, comprising an open topped pan and a shield device having an apertured top and downturned marginal flanges adapted to rest on the bottom of the pan, said flanges being of less width than the walls whereby the projecting portions of the walls act as baffles to prevent scattering of grain, and whereby the shield device may be adjusted vertically within the pan in conformity to the amount of feed contained therein.

WILLIAM A. McCOLLOUGH.